United States Patent
Qi et al.

(10) Patent No.: US 12,483,008 B2
(45) Date of Patent: Nov. 25, 2025

(54) SWITCHGEAR CONTROL DEVICE AND METHOD BASED ON ELECTROLYTIC DEHUMIDIFICATION MEMBRANE WITH WIDE WORKING RANGE

(71) Applicant: South China University of Technology, Guangzhou (CN)

(72) Inventors: Ronghui Qi, Guangzhou (CN); Ying Lu, Guangzhou (CN); Lizhi Zhang, Guangzhou (CN); Yuhao Xu, Guangzhou (CN); Mingfei Dai, Guangzhou (CN)

(73) Assignee: South China University of Technology, Guangzhou (CN)

( * ) Notice: Subject to any disclaimer, the term of this patent is extended or adjusted under 35 U.S.C. 154(b) by 0 days.

(21) Appl. No.: 19/273,096

(22) Filed: Jul. 17, 2025

(65) Prior Publication Data

US 2025/0343400 A1    Nov. 6, 2025

Related U.S. Application Data

(63) Continuation of application No. PCT/CN2025/095990, filed on May 20, 2025.

(30) Foreign Application Priority Data

Jul. 25, 2024 (CN) .......................... 202411003912.4

(51) Int. Cl.
*H02B 1/56* (2006.01)
*B01D 53/26* (2006.01)
(Continued)

(52) U.S. Cl.
CPC .......... *H02B 1/565* (2013.01); *B01D 53/268* (2013.01); *B01D 53/30* (2013.01); *B01D 53/326* (2013.01);
(Continued)

(58) Field of Classification Search
CPC ........ H02B 1/28; H02B 1/565; B01D 53/268; B01D 53/30; B01D 53/326; B01D 2257/80; B01D 2258/06
See application file for complete search history.

(56) References Cited

U.S. PATENT DOCUMENTS 4,967,295 A * 10/1990 Yamauchi .............. B01D 53/26
  360/99.18
5,096,549 A * 3/1992 Yamauchi .............. B01D 53/26
  204/266
(Continued)

FOREIGN PATENT DOCUMENTS

CN  106400047 A  2/2017
CN  108151191 A * 6/2018 ................ F24F 3/14
(Continued)

OTHER PUBLICATIONS

"Performance analysis and manipulation of a proton exchange membrane (PEM) dehumidification system", Li, Dujuan, China Doctoral Dissertation Full-text Database; Engineering Science and Technology I, 2020, No. 6, BO15-50 cited in CNIPA Office Action as: "Study and Control of Electrolyte Membrane Dehumidification System Performance"; 135 pages, Published Jun. 15, 2020.
(Continued)

*Primary Examiner* — Robert J Hoffberg
(74) *Attorney, Agent, or Firm* — Addison D. Ault; IPGentleman Intellectual Property Services, LLC

(57) ABSTRACT

The invention discloses a switchgear control device and method based on an electrolytic dehumidification membrane with a wide working range, which relates to the technical field of moisture-proof dehumidification equipment. The wide working range (−10 to 70° C., 20%-100% RH) is applicable in cold, hot, and other extreme environments,
(Continued)

with no icing, frosting, or damage due to supercooling, overheating, and other issues.

6 Claims, 2 Drawing Sheets

(51) Int. Cl.
    *B01D 53/30*     (2006.01)
    *B01D 53/32*     (2006.01)
    *H02B 1/28*     (2006.01)
    *H05K 7/20*     (2006.01)

(52) U.S. Cl.
    CPC ........... *H02B 1/28* (2013.01); *H05K 7/20136* (2013.01); *B01D 2257/80* (2013.01); *B01D 2258/06* (2013.01)

(56) References Cited

U.S. PATENT DOCUMENTS

| | | | |
|---|---|---|---|
| 11,420,156 B2* | 8/2022 | Qi | B01D 53/326 |
| 11,876,268 B2* | 1/2024 | Karatay | H01M 8/1081 |
| 12,194,412 B2* | 1/2025 | Tocchetto | B01D 53/228 |
| 12,381,245 B2* | 8/2025 | Liu | C25B 13/08 |
| 2024/0274897 A1* | 8/2024 | Han | H01M 10/615 |
| 2024/0426008 A1* | 12/2024 | Liu | H01M 4/926 |
| 2024/0426009 A1* | 12/2024 | Shang | C25B 13/08 |

FOREIGN PATENT DOCUMENTS

| | | | | |
|---|---|---|---|---|
| CN | 119882866 A | * | 4/2025 | ............ G05D 22/02 |
| JP | 2915019 B2 | * | 7/1999 | |
| KR | 102100128 B1 | | 6/2020 | |

OTHER PUBLICATIONS

CNIPA First Office Action, Application No. 202411003912.4, dated Aug. 30, 2024, pp. 1-10; Chinese original.
CNIPA First Office Action, Application No. 202411003912.4, dated Aug. 30, 2024, pp. 1-10; English translation.
CNIPA Notice of Patent Right Grant, Application No. 202411003912.4, dated Sep. 30, 2024, 1 page, Chinese original.
CNIPA Notice of Patent Right Grant, Application No. 202411003912.4, dated Sep. 30, 2024, pp. 1-2; English translation.
"Performance analysis and manipulation of a proton exchange membrane (PEM) dehumidification system", Li, Dujuan, China Doctoral Dissertation Full-text Database; Engineering Science and Technology I, 2020, No. 6, BO15-50 cited in CNIPA Office Action as: "Study and Control of Electrolyte Membrane Dehumidification System Performance"; 135 pages, Published Jun. 15, 2020, English machine translation generated Aug. 13, 2025.

* cited by examiner

SWITCHGEAR CONTROL DEVICE AND METHOD BASED ON ELECTROLYTIC DEHUMIDIFICATION MEMBRANE WITH WIDE WORKING RANGE

TECHNICAL FIELD

The invention relates to the technical field of moisture-proof and dehumidification equipment, and specifically relates to a switchgear control device and method based on an electrolytic dehumidification membrane with a wide working range.

BACKGROUND

Switchgear is a kind of electrical equipment. Because it contains many electrical components and sensors, the temperature and humidity in a switchgear cabinet have an important influence on its stability and insulation performance. Switchgears are often located in wet underground spaces or in direct contact with outdoor environments, which are susceptible to moisture erosion. When the internal humidity of the switchgear is too high or the ambient temperature is lower than the air dew point temperature in the cabinet, it will lead to condensation or even water accumulation, causing problems such as terminal corrosion, instrument insulation degradation, and internal contact short circuit. When the outdoor temperature is low and the humidity is high, the inner wall may also frost and freeze. According to statistics, from 2016 to 2018, 70% of the faults of power equipment such as box transformers, outdoor terminal boxes, and ring network cabinets are directly or indirectly caused by condensation and frosting, which seriously affects the safety of the distribution network and the normal power supply to users.

At present, moisture-proof switchgear generally has the following defects: fully enclosed switchgear can prevent water entering the cabinet, but at the same time, it also causes the internal moisture to be difficult to discharge smoothly. The installation of heating pipe can increase the temperature in the cabinet and reduce the relative humidity, but it will lead to the increase of temperature in the cabinet, and when the heating pipe is opened, the hot gas rises, which will accelerate the condensation of moisture at the top. In addition, a temperature in the switchgear that is too high will also make the components age, thus affecting the life of the components. The placement of desiccant in the switchgear can obtain an obvious moisture-proof effect, but once the desiccant is saturated, the dehumidification effect is lost, and the replacement maintenance cost is high. Rotary wheel dehumidification equipment is complex, covers an area of large and high energy consumption, it is difficult to deploy in practical applications. Semiconductor condensation dehumidification condenses water through a semiconductor refrigeration sheet and then discharges the water out of the cabinet through a water pipe, which has a risk of water leakage. When the outdoor temperature is high (40 degrees or above), it is difficult to dehumidify due to the difficulty of heat dissipation of the cooling plate, while when the outdoor temperature is low (10 degrees or below), the water box will freeze, which not only cannot dehumidify but also may cause serious problems. Moreover, the diameter of the semiconductor dehumidification drain pipe is generally 8-10 mm, which will destroy the IP protection level of the switchgear and may lead to more serious accidents.

The electrolytic dehumidification technology based on a proton exchange membrane is an electrochemical active humidity treatment method, by applying a low-voltage electric field on both sides of the electrolytic dehumidification membrane, wherein the water vapor on the anode side (i.e., the box body) undergoes an electrolytic reaction, the generated $H^+$ carries water molecules through the electrolytic dehumidification membrane to the environmental side (i.e., outside the box body), and most of them generate water vapor again, thereby discharging the excess humidity in the box. In the process of electrolytic dehumidification, there is no condensation water, and no icing risk. The thickness of the electrolytic dehumidification membrane is only about 1 mm, which is small and compact, it is suitable for assembly in the form of a dehumidification module according to different target humidity and space requirements, the exhaust air exchange hole is small and easy to maintain. The dehumidification rate can be accurately adjusted by adjusting the applied electric field, which is easy to control. In addition, the combination of electrolytic dehumidification membrane dehumidification technology and cabinet exhaust can reduce the humidity in the cabinet while discharging excess heat, so as to achieve the purpose of controlling the microenvironment of the switchgear.

The patent KR102100128B1 discloses a switch cabinet with a charged dehumidifying function, although the porous electrode carbon fiber has been improved in this invention, the core of the electrolytic dehumidification membrane, namely the proton-conducting polymer, has not been improved. At present, the commonly used proton-conducting polymer is perfluorosulfonic acid (PFSA) polymer, which has the problems of easy damage at high temperatures, low proton conductivity at low temperature or low humidity, and difficult electrochemical reaction, which limits its application range. Therefore, it is necessary to develop a wide working range electrolyte membrane that can work normally in the environment of −10 to 70° C. and 20-100% RH, which is suitable for switchgear with large environmental changes.

SUMMARY

The purpose of the invention is to provide a switchgear control device and method based on an electrolytic dehumidification membrane with a wide working range, and to solve the problems that the existing devices proposed in the above background technology are difficult to achieve moisture-proof effect or complex equipment, difficult to maintain, and need drainage pipes. In particular, it solves the problem that the semiconductor condensation dehumidification technology is difficult to start when the outdoor environment is high (about 40° C. or more), and frosts and cannot be used when the ambient temperature is low (about 10° C. or less), improves the moisture-proof performance of the switchgear in actual use, optimizes the microenvironment inside the switchgear, and reduces the failure rate of the electrical components inside the switchgear.

In order to achieve the above purpose, the invention provides a switchgear control device based on an electrolytic dehumidification membrane with a wide working range, including a switchgear, an internal of the switchgear is provided with an ventilation flow channel, an electrolytic dehumidification component, a direct current (DC) voltage regulator connected to the electrolytic dehumidification component, a temperature sensor, and a humidity sensor, an external of the switchgear is provided with a single-chip microcomputer control system, a side wall of the switchgear is provided with an air exchange hole connected to an outlet of the ventilation flow channel, the electrolytic dehumidification component includes an upper shell, a lower shell and a dehumidification membrane electrode pressed and connected to the upper shell and the lower shell, two sides of the upper shell and the lower shell are respectively connected to an air intake fan and an ventilator, the dehumidification membrane electrode includes a first mesh electrode, an electrolytic dehumidification membrane and a second mesh electrode arranged in turn;

where a working temperature and humidity range of the electrolytic dehumidification membrane with a wide working range is −10 to 70° C., 20%-100% RH; the electrolytic dehumidification membrane material is a proton-conducting polymer doped with a hygroscopic inorganic filler and a thermally stable organic filler, where according to weight percentage: 1-10% hygroscopic inorganic filler, 1-30% thermally stable organic filler, 60-98% proton-conducting polymer.

Preferably, the first mesh electrode and the second mesh electrode have the same structure, they are metal mesh structures sprayed with a composite coating; where, the composite coating includes components according to the following weight percentage: 50-89% catalyst particles, 10-40% proton-conducting polymer, 1-10% hygroscopic inorganic filler, a metal mesh material is one of titanium, nickel, molybdenum, stainless steel and alloys thereof, a thickness of the metal mesh is 0.5-2 mm and a mesh number is 5-20.

Preferably, the hygroscopic inorganic filler is one of $SiO_2$, $ZrO_2$, and $TiO_2$; the thermally stable organic filler is a low water swelling fluorine-containing polymer or a polymer containing ether group, sulfone group, and ketone group; the proton-conducting polymer is one of perfluorosulfonic acid resin, sulfonated polysulfone, and aryl polymer.

Preferably, the low water swelling fluoropolymer is polytetrafluoroethylene or polyvinylidene fluoride; the polymer containing ether group, sulfone group, and ketone group is one of polyetheretherketone, sulfonated polysulfone, polyethersulfone, and polybenzimidazole.

Preferably, the catalyst is one of the iridium, ruthenium, platinum, titanium, molybdenum, and alloy particles thereof supported on a conductive carrier, a particle size of the catalyst is 4-50 nm, and the conductive carrier is one of titanium, tin, carbon or the composites thereof.

Preferably, terminals of the first mesh electrode and the second mesh electrode are connected to the DC voltage regulator through a wire.

Preferably, the DC voltage regulator, the temperature sensor, the humidity sensor, the air intake fan, and the ventilator are all electrically connected to the single-chip microcomputer control system.

This invention also provides a switchgear control method based on the electrolytic dehumidification membrane with a wide working range, including the following steps:

(1) collecting the temperature information and humidity information inside the switchgear by the temperature sensor and humidity sensor respectively and sending the temperature information and humidity information to the single-chip microcomputer control system;

(2) according to the collected temperature and humidity information, controlling the air intake fan or ventilator to turn on;

when the single-chip microcomputer control system judges that the humidity in the cabinet is too high, the air intake fan is controlled to turn on; or when the single-chip microcomputer control system judges that the temperature in the cabinet is too high, the ventilator is controlled to turn on; or when the single-chip microcomputer control system determines that the temperature and humidity in the cabinet are too high, the air intake fan and the ventilator are controlled to turn on.

Therefore, the invention provides a switchgear control device and method based on an electrolytic dehumidification membrane with a wide working range, which has the following advantages:

(1) The electrolytic dehumidification membrane uses low-voltage direct current to drive water to decompose and transfer from the inside to the outside of the cabinet, there is no condensed water, no drainage pipe, no safety hazard, and it can also avoid the temperature rise in the switchgear caused by heating and moisture proofing, it improves the moisture proofing performance of the switchgear, avoids excessive temperature in the cabinet, and reduces the failure rate of electrical components inside the switchgear.

(2) The electrolytic dehumidification membrane provided by the invention has a wide working range, in addition to working at room temperature (20° C.-40° C.), it can withstand high temperatures to 70° C. at the highest, and can withstand low temperatures to −10° C. at the lowest, it can work normally without damage, failure, frosting or water freezing at the relative humidity of 20%-100%.

(3) The device structure of the invention is simple, and the electrolytic dehumidification component is easy to control, the voltage can be adjusted by the single-chip microcomputer control system to accurately control the dehumidification effect, and the response is fast.

(4) The moisture-proof and temperature control function of the switchgear is realized by the single-chip microcomputer control system, the temperature sensor and humidity sensor monitor the internal temperature and humidity of the cabinet, when the temperature is too high, the single-chip microcomputer control system starts the ventilator and increases the power; when the humidity sensor monitors the humidity is too large, the dehumidification device and the air intake fan are started and the power is increased. Therefore, the invention can accurately control the humidity in the cabinet, prevent condensation in the cabinet, and ensure that the temperature in the cabinet is not too high, thereby improving the stability and service life of the electrical components inside the switchgear.

The following is a further detailed description of the technical scheme of the invention through drawings and implementation examples.

Marks in the FIGS.

1, switchgear; 2, DC voltage regulator; 3, temperature sensor; 4, humidity sensor; 5, single-chip microcomputer control system; 6, air exchange hole; 7, upper shell; 8, lower shell; 9, air intake fan; 10, ventilator; 11, first mesh electrode; 12, electrolytic dehumidification membrane; 13, second mesh electrode; 14, ventilation flow channel.

DETAILED DESCRIPTION OF THE EMBODIMENTS

Figure 1:
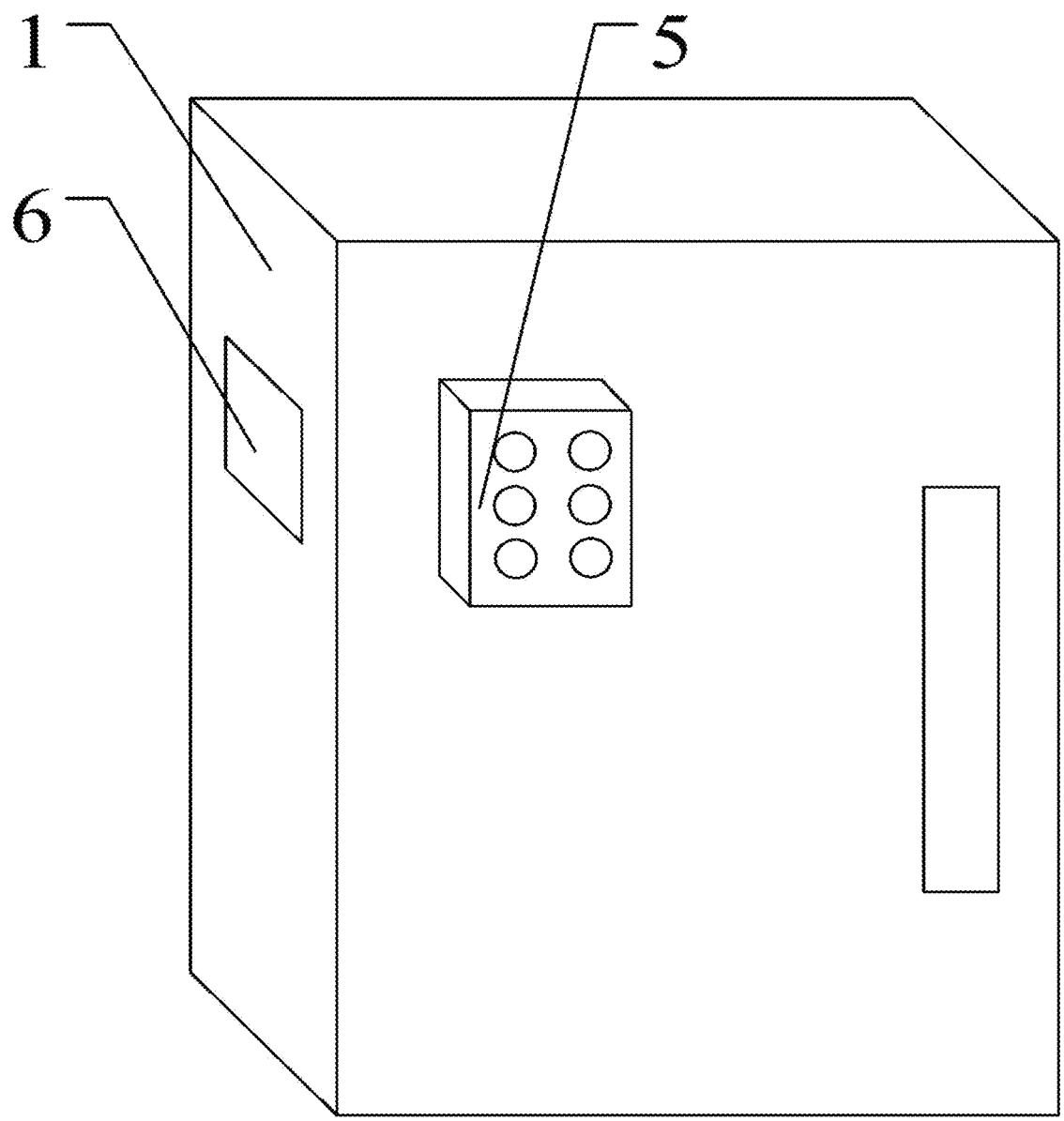
FIG. 1 is a schematic diagram of the external structure of the switchgear microenvironment control device based on the electrolytic dehumidification membrane.
Figure 2:
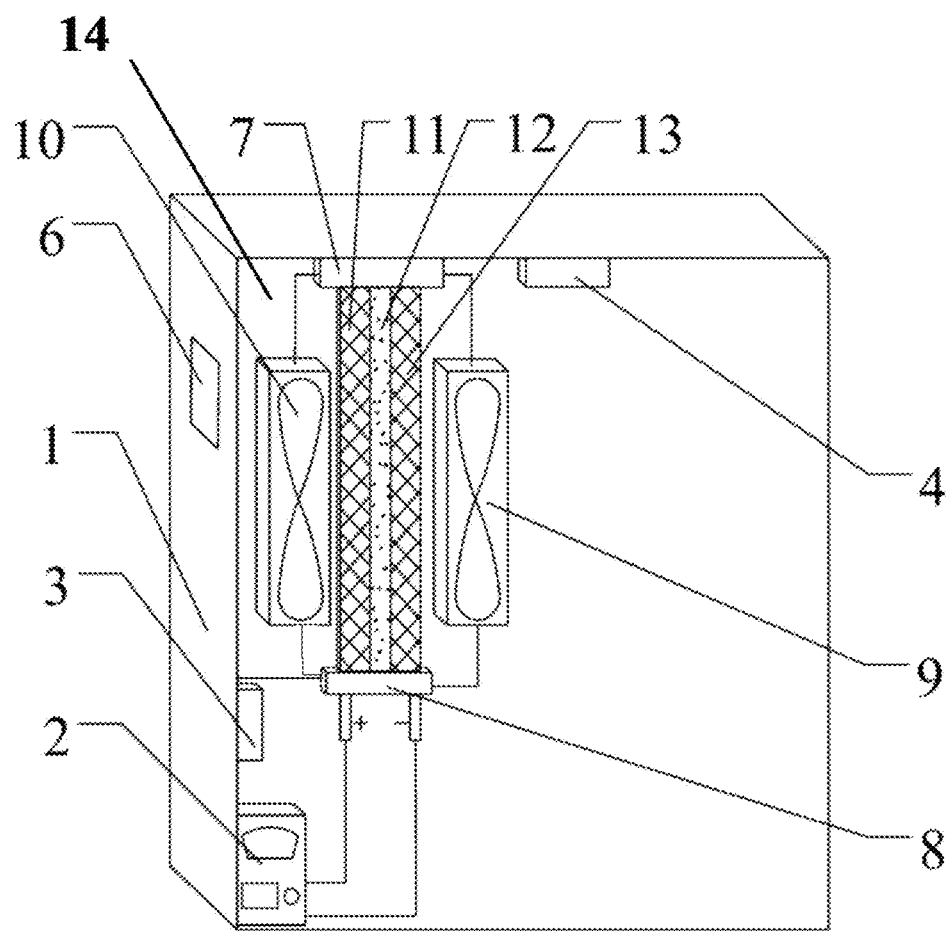
FIG. 2 is a schematic diagram of the internal structure of the switchgear microenvironment control device based on the electrolytic dehumidification membrane.

As shown in FIGS. 1-2, the invention provides a switchgear control device based on an electrolytic dehumidification membrane with a wide working range, including a switchgear 1, the internal area of the switchgear 1 is equipped with a ventilation flow channel 14 which is equipped with an electrolytic dehumidification component, a DC voltage regulator 2, a temperature sensor 3 and a humidity sensor 4, the external of the switchgear 1 is equipped with a single-chip microcomputer control system 5, the side wall of the switchgear 1 has an air exchange hole 6 connected with the outlet of the ventilation flow channel 14; the temperature sensor 3 and the humidity sensor 4 can be set up inside the cabinet to monitor the temperature and humidity around the key electrical components in the cabinet. The DC voltage regulator 2, temperature sensor 3, humidity sensor 4, air intake fan 9, and ventilator 10 are electrically connected to the single-chip microcomputer control system 5.

The electrolytic dehumidification component includes the upper shell 7, the lower shell 8, and the dehumidification membrane electrode pressed in and connected with the upper shell 7 and the lower shell 8, the two sides of the upper shell 7 and the lower shell 8 are respectively connected to the air intake fan 9 and the ventilator 10; the humidity sensor 4 is located near the air intake fan 9, and the temperature sensor 3 is located near the ventilator 10. The dehumidification membrane electrode includes the first mesh electrode 11, the electrolytic dehumidification membrane 12, and the second mesh electrode 13, the connection end of the first mesh electrode 11 and the second mesh electrode 13 is connected to the DC voltage regulator 2 through a wire.

In this invention, the electrolytic dehumidification membrane material includes the following weight percentage components: 1-10% hygroscopic inorganic filler, 1-30% thermally stable organic filler, and 60-98% proton-conducting polymer.

In the invention, the hygroscopic inorganic filler is one of $SiO_2$, $ZrO_2$, and $TiO_2$; the thermally stable organic filler is a low water swelling fluorine-containing polymer or a polymer containing ether groups, such as polyether ether ketone, sulfonated polysulfone, polyether sulfone, and polybenzimidazole; the proton-conducting polymer is one of perfluorosulfonic acid resin, sulfonated polysulfone, and aryl polymer.

In the invention, the first mesh electrode and the second mesh electrode have the same structure, both of which are the metal mesh structure sprayed with the composite coating of catalyst and inorganic hygroscopic filler; where the metal mesh material is one of titanium, nickel, molybdenum, stainless steel and alloys thereof, the thickness of the metal mesh is 0.5-2 mm and the mesh number is 5-20.

In this invention, the catalyst is one of the iridium, ruthenium, platinum, titanium, molybdenum, and alloy particles thereof loaded on the conductive carrier. The catalyst particle size is 4-50 nm, and the conductive carrier is titanium, tin, carbon, or one of the composite materials thereof, the methods of catalyst loading on conductive carriers include electrospinning, in-situ synthesis, and sol-gel method.

The invention also provides a switchgear microenvironment control method based on an electrolytic dehumidification membrane, including the following steps:

(1) collecting the temperature information and humidity information inside the switchgear by the temperature sensor and humidity sensor respectively and sending the temperature information and humidity information to the single-chip microcomputer control system;

(2) according to the collected temperature and humidity information, controlling the air intake fan or ventilator to turn on;

a, when the single-chip microcomputer control system judges that the temperature in the cabinet is normal and the humidity is too high according to the temperature and humidity information, the electrolytic dehumidification component is started and the air intake fan is turned on; if the humidity in the cabinet deviates greatly from the set value, the power of the electrolytic dehumidification component and the air intake fan is controlled to increase;

b, when the single-chip microcomputer control system judges that the temperature in the cabinet is too high and the humidity is normal according to the temperature and humidity information, the ventilator in the ventilation flow channel is controlled to open; if the temperature in the cabinet deviates greatly from the set value, the power of the ventilator is controlled to increase;

c, when the single-chip microcomputer control system judges that the temperature and humidity in the cabinet are too high according to the temperature and humidity information, the electrolytic dehumidification component is controlled to start and the air intake fan is turned on, and the ventilator in the ventilation flow channel is controlled to turn on; if the temperature and humidity in the cabinet deviate greatly from the set value, the power of the electrolytic dehumidification component, the air intake fan and the ventilator should be controlled to increase.

The following detailed description of the embodiment of the invention provided in the accompanying diagram is not intended to limit the scope of the invention requiring protection, but merely indicates the selected embodiment of the invention. Based on the embodiments in this invention, all other embodiments obtained by ordinary technicians in this field without making creative labor belong to the scope of protection of this invention.

Unless otherwise defined, the technical terms or scientific terms used in the invention should be understood by people with general skills in the field to which the invention belongs. The words 'first', 'second', and the like used in this invention do not represent any order, quantity, or importance, but are only used to distinguish different components. Similar words such as 'include' or 'including' mean that the elements or objects appearing before the word cover the elements or objects listed after the word and their equivalents, without excluding other elements or objects, similar terms such as 'connected' or 'connecting' are not limited to physical or mechanical connections, but can include electrical connections, whether direct or indirect. 'Up', 'down', 'left', 'right', etc. are only used to represent relative positional relationships, when the absolute position of the described object changes, the relative positional relationship may also change accordingly.

The specific connection methods of each part adopt conventional means such as mature bolts, rivets, and welding in the existing technology. The machinery, parts, and equipment adopt the conventional model in the existing technology. In addition, the circuit connection adopts the conventional connection method in the existing technology, which is no longer described here.

According to the invention, the experiment is carried out by using the above electrolytic dehumidification membrane to further understand the invention, the protection range of the invention is not limited by the following embodiments.

In the following, the experimental results of the application of the electrolytic dehumidification membrane provided by the invention to the moisture-proof performance of the switchgear are verified in combination with the implementation example.

The electrolyte membrane in the embodiment in the following is a proton-conducting polymer doped with hygroscopic inorganic fillers and thermally stable organic fillers, specifically: 6% hygroscopic inorganic filler, 30% thermally stable organic filler, 64% proton-conducting polymer. The mesh electrode is a metal mesh structure sprayed with a composite coating of a catalyst and an inorganic moisture-absorbing filler. The metal mesh material is titanium and the thickness of the metal mesh is 1 mm. The composite coating is: 70% catalyst particles, 25% proton-conducting polymer, and 5% hygroscopic inorganic filler;

where the proton-conducting polymer used is perfluorosulfonic acid resin, the hygroscopic inorganic filler is $SiO_2$, and the thermally stable organic filler is polytetrafluoroethylene. The catalyst particle size is 5 nm.

Example 1

This implementation example verifies the moisture-proof results of cabinets with different electrolytic dehumidification membrane structures, and the results are shown in Table 1. The dehumidification system applied to the moisture-proof of cabinet operates under the following conditions: the volume of the cabinet is 40L, and no components are placed inside the cabinet. The temperature in the cabinet is 24° C., and the initial humidity in the cabinet is 65% when the system is operating. The electrolytic dehumidification membrane is installed inside the cabinet and connected to the external environment through the ventilation flow channel. In this example, only the DC voltage regulator 2 connected to the electrolytic dehumidification component is turned on, the operating voltage is 3V, and the air intake fan and ventilator are not turned on.

TABLE 1

|  | Final relative humidity (% RH) in the cabinet | Final relative humidity difference (% RH) between the cabinet and the outside world |
| --- | --- | --- |
| Existing technology (no moisture-proof scheme) | 65% | 0% |
| 10 mesh titanium mesh is used as the dehumidification membrane electrode of the electrode metal mesh structure | 23.8% | 41.2% |
| Dehumidification membrane electrode with 3 mesh titanium mesh as electrode metal mesh structure is used | 30.9% | 34.1% |
| Dehumidification membrane electrode using carbon paper, without adding hygroscopic inorganic filler and thermally stable organic filler | 49.8% | 15.2% |

It can be seen from Table 1 that the cabinet body using the electrolytic dehumidification membrane proposed in the invention achieves better dehumidification and moisture-proof effect, and the electrolytic dehumidification membrane using the mesh electrode proposed in the invention has a better moisture-proof effect.

Example 2

This implementation example verifies the moisture-proof results of cabinets at different temperatures, and the results are shown in Table 2. The electrolytic dehumidification membrane is installed inside the cabinet and connected to the external environment through the ventilation flow channel. In this implementation, only the DC voltage regulator connected to the electrolytic dehumidification component is turned on, the operating voltage is 3V, and the air intake fan and ventilator are turned on. The electrolytic dehumidification membrane operates under the following conditions: the relative humidity in the cabinet is 80%, and the operating time is 30 minutes. The dehumidification rate is calculated as follows:

$$\dot{m}_{dehumidification} = \frac{\rho_{wet\ air}(w_{after\ operating} - w_{before\ operating})V}{\tau_{operating\ time}}$$

In the formula, $\dot{m}_{dehumidification}$ is the dehumidification rate of the electrolytic dehumidification membrane, V is the size of the cabinet, w is the absolute moisture content of the air (g/kg dry air), t is the operating time; ρ is the density of wet air.

TABLE 2

Summary table of moisture-proof results of cabinets at different temperatures

|  | Operating temperature ° C. | Dehumidification rate × $10^{-4}$ g/s |
| --- | --- | --- |
| 10 mesh titanium mesh is used as the dehumidification membrane electrode of the electrode metal mesh structure | 70 | 3.6 |
|  | 50 | 2.068 |
|  | 30 | 0.899 |
|  | 5 | 0.31 |
|  | −10 | 0.11 |
| Dehumidification membrane electrode using carbon paper, without adding hygroscopic inorganic filler and thermally stable organic filler | 70 | Unable to operate |
|  | 50 | 0.86 |
|  | 30 | 0.71 |
|  | 5 | 0.27 |
|  | −10 | Unable to operate |

From Table 2, it can be seen that the dehumidification rate of the cabinet based on the electrolytic dehumidification membrane with a wide working range proposed in the invention increases with the increase of the operating temperature, the electrolytic dehumidification film at high temperatures and low temperatures has achieved good moisture-proof effect of the cabinet, especially under the operating conditions of higher than 60° C. and lower than 0° C., it still operates stably, without overheating, freezing, frosting and other conditions.

Example 3

The example verifies the moisture-proof results of the cabinet under different control conditions, and the results are shown in Table 3. The system operates under the following conditions: the volume of the cabinet is 6L, the initial temperature of the cabinet is 30° C., and the initial humidity of the cabinet is 60%. The electrolytic dehumidification membrane is installed inside the cabinet and connected to the outside world through the ventilation flow channel. In this embodiment, the DC voltage regulator and single-chip microcomputer control system connected to the electrolytic dehumidification component are turned on, the operating voltage is 3V, and the air intake fan and ventilator are not turned on. The temperature and humidity changes and humidity control effects in the cabinet during operation are recorded by temperature and humidity sensors. When the sensor detects that the humidity in the cabinet exceeds the target value, the single-chip microcomputer control system starts the electrolytic dehumidification membrane; when the sensor detects that the gap between the humidity in the box and the target value increases, the single-chip microcomputer control system adjusts the power of the electrolytic dehumidification membrane and the power of the air intake fan and the ventilator.

TABLE 3

|  | Condition 1 | Condition 2 |
|---|---|---|
| Target humidity | 60% | 60% |
| Experimental conditions | The temperature of the box is reduced from 30° C. to 20° C. and maintained, and the relative humidity in the box is increased from 60% to 67.9%. | The temperature of the box decreased from 20° C. to 10° C. and maintained, and the relative humidity in the box increased from 60% to 68.7%. |
| Control effect | When the humidity in the box exceeds 60%, the electrolytic dehumidification membrane is turned on, and the air intake fan and ventilator are not turned on, in 10 minutes, the humidity of the box gradually decreases to the target humidity and maintains. | When the humidity in the box exceeds 60%, the electrolytic dehumidification membrane is turned on, and the air intake fan and ventilator are not turned on. In 20 minutes, the humidity of the box gradually decreases to the target humidity and is maintained. |
| Control precision | ±0.4% RH | ±0.5% RH |

It can be seen from Table 3 that the cabinet moisture-proof based on the electrolytic dehumidification membrane proposed in the invention can effectively avoid and solve the increase of relative humidity in the cabinet when the temperature of the cabinet decreases, and the regulation is accurate and the humidity control is high.

Therefore, the invention provides a switchgear control device and method based on an electrolytic dehumidification membrane with a wide working range, which solves the problem that the semiconductor condensation dehumidification technology will freeze and cannot be used when the outdoor environment is lower than zero degrees, improves the moisture resistance of the switchgear in actual use, avoids the high temperature in the cabinet, optimizes the microenvironment in the switchgear, and reduces the failure rate of the internal electrical components of the switchgear.

Finally, it should be explained that the above embodiments are only used to explain the technical scheme of the invention rather than restrict it. Although the invention is described in detail concerning the better embodiment, the ordinary technical personnel in this field should understand that they can still modify or replace the technical scheme of the invention, and these modifications or equivalent substitutions cannot make the modified technical scheme out of the spirit and scope of the technical scheme of the invention.

What is claimed is:

1. A switchgear control device based on an electrolytic dehumidification membrane with a working range, comprising a switchgear, wherein an internal area of the switchgear is provided with a ventilation flow channel, an electrolytic dehumidification component, a direct current (DC) voltage regulator connected to the electrolytic dehumidification component, a temperature sensor, and a humidity sensor, wherein an external area of the switchgear is provided with a single-chip microcomputer control system, wherein a side wall of the switchgear is provided with an air exchange hole connected to an outlet of the ventilation flow channel, wherein the electrolytic dehumidification component at least in part separates the ventilation flow channel from a rest of the internal area of the switchgear, the electrolytic dehumidification component comprises an upper shell, a lower shell and a dehumidification membrane electrode pressed and connected to the upper shell and the lower shell, wherein two sides of the upper shell and the lower shell are respectively connected to an air intake fan and an ventilator, and wherein the dehumidification membrane electrode comprises a first mesh electrode, an electrolytic dehumidification membrane and a second mesh electrode arranged in turn;

wherein a working temperature and humidity range of the electrolytic dehumidification membrane with the working range is −10 to 70° C., 20%-100% RH; an electrolytic dehumidification membrane material is a proton-conducting polymer doped with a hygroscopic inorganic filler and a thermally stable organic filler, comprising, according to weight percentage: 1-10% hygroscopic inorganic filler, 1-30% thermally stable organic filler, 60-98% proton conducting polymer;

wherein the first mesh electrode and the second mesh electrode have the same structure, both of which are a metal mesh structure sprayed with a composite coating of catalyst and inorganic hygroscopic filler; wherein the composite coating comprises components according to the following weight percentage: 50-89% catalyst particles, 10-40% proton-conducting polymer, 1-10% hygroscopic inorganic filler, and wherein a metal mesh material is one of titanium, nickel, molybdenum, stainless steel and alloys thereof, and wherein a thickness of the metal mesh is 0.5-2 mm and a mesh number is 5-20;

wherein the hygroscopic inorganic filler is selected from $SiO_2$, $ZrO_2$, and $TiO_2$; the thermally stable organic filler is a low water swelling fluorine-containing polymer or a polymer containing an ether group, a sulfone group, or a ketone group; and wherein the proton-conducting polymer is one of perfluorosulfonic acid resin, sulfonated polysulfone, or aryl polymer.

2. The switchgear control device based on the electrolytic dehumidification membrane with the working range according to claim 1, wherein the low water swelling fluoropolymer is polytetrafluoroethylene or polyvinylidene fluoride; and wherein the polymer containing an ether group, a sulfone group, or a ketone group is one of polyetheretherketone, sulfonated polysulfone, polyethersulfone and polybenzimidazole.

3. The switchgear control device based on the electrolytic dehumidification membrane with the working range according to claim 1, wherein the catalyst is one of iridium, ruthenium, platinum, titanium, molybdenum or alloy particles thereof supported on a conductive carrier, wherein a particle size of the catalyst is 4-50 nm, and wherein the conductive carrier is one of titanium, tin, carbon or the composites thereof.

4. The switchgear control device based on the electrolytic dehumidification membrane with the working range according to claim 1, wherein terminals of the first mesh electrode and the second mesh electrode are connected to the DC voltage regulator through a wire.

5. The switchgear control device based on the electrolytic dehumidification membrane with the working range according to claim 1, wherein the DC voltage regulator, the temperature sensor, the humidity sensor, the air intake fan, and the ventilator are all electrically connected with the single-chip microcomputer control system.

6. A method of controlling the switchgear device based on the electrolytic dehumidification membrane with the working range according to claim 1, comprising the following steps:
  (1) collecting temperature information and humidity information from inside the internal area of a cabinet of the switchgear by the temperature sensor and the humidity sensor respectively and sending the temperature information and the humidity information to the single-chip microcomputer control system;
  (2) according to the collected temperature information and the collected humidity information, controlling at least one of the air intake fan or the ventilator to turn on;
  wherein, when the single-chip microcomputer control system judges that a humidity value in the internal area of the cabinet exceeds a target humidity value, the air intake fan is controlled to turn on; or when the single-chip microcomputer control system judges that a temperature in the internal area of the cabinet exceeds a target temperature value, the ventilator is controlled to turn on; or when the single-chip microcomputer control system determines that the temperature and the humidity in the internal area of the cabinet exceeds the target temperature value and the target humidity value, respectively, the air intake fan and the ventilator are controlled to turn on.

\* \* \* \* \*